(12) United States Patent
Aupperle et al.

(10) Patent No.: US 8,074,200 B2
(45) Date of Patent: Dec. 6, 2011

(54) METHOD AND SYSTEM FOR PROVIDING TOOLING INSTRUCTIONS THROUGH PARAMETERIZATION AS AN AID FOR SOFTWARE APPLICATION DEVELOPMENT

(75) Inventors: Bryan Eric Aupperle, Cary, NC (US); Jonathan Gellin, Raleigh, NC (US); Cynthia Ferguson Krauss, Raleigh, NC (US); Srinivasan Muralidharan, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1328 days.

(21) Appl. No.: 11/549,920

(22) Filed: Oct. 16, 2006

(65) Prior Publication Data

US 2008/0189675 A1 Aug. 7, 2008

(51) Int. Cl.
*G06F 9/44* (2006.01)
(52) U.S. Cl. .......................... 717/104; 717/105
(58) Field of Classification Search .................. 717/104, 717/105
See application file for complete search history.

(56) References Cited

U.S. PATENT DOCUMENTS

| | | | |
|---|---|---|---|
| 6,269,473 B1 * | 7/2001 | Freed et al. | 717/104 |
| 6,484,149 B1 | 11/2002 | Jammes et al. | |
| 6,694,505 B1 * | 2/2004 | Tan | 717/100 |
| 6,704,120 B1 | 3/2004 | Leone, III et al. | |
| 6,868,427 B2 * | 3/2005 | Herzog et al. | 707/104.1 |
| 7,188,335 B1 * | 3/2007 | Darr et al. | 717/121 |
| 7,552,418 B2 * | 6/2009 | Saad et al. | 717/100 |
| 2005/0273759 A1 * | 12/2005 | Lucassen et al. | 717/105 |
| 2005/0278709 A1 | 12/2005 | Sridhar et al. | |

FOREIGN PATENT DOCUMENTS

WO WO2005031510 A1 4/2005

OTHER PUBLICATIONS

"Reusable Asset Specification"; Object Management Group, Apr. 2005; [http://www.omg.org/cgi-bin/doc?ptc/2005-04-02], p. 1-131.
"Feature-Oriented Development of Applications for a Domain"; Kang, K.C., Jun. 1998 , Software Reuse, Proceedings, Fifth International Conference (1998), p. 354-355.
Lawrence Bergman, Tessa Lau, Vittorio Castelli, Daniel Oblinger, Personal Wizards: Collaborative End-user Programming, Article, Apr. 2003, pp. 1-4, International Conference on Human Factors in Computing Systems, Fort Lauderdale, FL, USA.

* cited by examiner

*Primary Examiner* — Wei Zhen
*Assistant Examiner* — Qamrun Nahar
(74) *Attorney, Agent, or Firm* — Lee Law, PLLC; Christopher B. Lee

(57) ABSTRACT

An invention is disclosed for a programming method and system of implementing parameterization of data types and/or categories to convert an example "instance" of using a software application into an actual product of program use by customizing the example to make it suitable for user needs. A parameter modeling component along with a parameterization component and an instantiation component are used to create parameterized example instances ("p-instances") and tooling instructions are then invoked to customize a "p-instance" into a real instance reflecting creation of a document or file or other program artifact (i.e., data product) resulting from actual use of the software application.

8 Claims, 4 Drawing Sheets

US 8,074,200 B2

METHOD AND SYSTEM FOR PROVIDING TOOLING INSTRUCTIONS THROUGH PARAMETERIZATION AS AN AID FOR SOFTWARE APPLICATION DEVELOPMENT

TECHNICAL FIELD

This invention relates to use of a technique for implementing parameterization of data types and/or categories to convert an example "instance" of using a software application into an actual product of program use by customizing the example to make it suitable for user needs.

BACKGROUND

Software application products are getting more complicated with the consequence that learning to use them has become increasingly difficult for the user. "Self-help" documentation is a secondary medium of assistance and is usually not the most effective way to learn use of a complex application product, while "jump-start" user interfaces (UI) such as "wizards" are helpful only for creating simple instances of use of a product.

A software application product is developed in accordance with "design schemas" or models that are programmed to produce "instances" of the documents and other files or program artifacts (i.e., the data products) created when the application is actually used for a real purpose. Presenting a software programming model framework for creating example instances that are invoked as a starting point for use of the product through parameterization (i.e. "p-instances") is simpler than revamping wizards and other UI features to reflect changes caused by evolving use of the product. Such a parameterization model framework allows software application developers to create "p-instances" utilizing graphical user interface (GUI) features and elements that allow users to create complex real instances of program use without completely mastering the application. Since a "p-instance" is a closer starting point to an actual instance than a wizard, it has the potential to allow users to achieve competence with the software application in less time than it would have otherwise taken to learn use of the software product with help documents and wizards.

Complex software applications require a different approach to parameterization than that used for simple applications, since textual "in place" substitutions (such as those used in working from an example "template" for a Microsoft Word® document file) are not suitable when there are multiple UI features or elements interacting with each other to produce and update documents or files or other program artifacts that may reference each other in ways that cause user actions to affect them in a complex and continuously evolving manner. The invention provides a mechanism for creating parameterization "tooling" (i.e. instructions) that can be used for producing "p-instances" in complex software applications.

SUMMARY OF THE INVENTION

An invention is disclosed for a programming method and system of implementing parameterization of data types and/or categories to convert an example "instance" of using a software application into an actual product of program use by customizing the example to make it suitable for user needs. A parameter modeling component along with a parameterization component and an instantiation component are used to create parameterized example instances ("p-instances") and tooling instructions are then invoked to customize a "p-instance" into a real instance reflecting creation of a document or file or other program artifact (i.e., data product) resulting from actual use of the software application. The information contained in the "p-instance" provides its basic structure and configuration, along with specific tooling instructions used to define the parameter data values that must be set to convert the "p-instance" into the real instance of the document or file or artifact. Use of the guidance provided by the tooling instructions causes the realization (or "instantiation") of data parameters that result in customization of the "p-instances" into real instances reflecting the products generated by actual use of the software.

It is therefore an object of the present invention to overcome the disadvantages of the prior art by providing a programming method and system for implementing parameterization of data types and/or categories to convert an example "instance" of using a software application into an actual product of program use by customizing the example to make it suitable for user needs.

It is another object of the present invention to overcome the disadvantages of the prior art by providing a parameter modeling component along with a parameterization component and an instantiation component to create parameterized example instances ("p-instances") that invoke tooling instructions to customize a "p-instance" into a real instance reflecting creation of a document or file or other program artifact (i.e., data product) resulting from actual use of a software application.

It is another object of the present invention to overcome the disadvantages of the prior art by providing a programming method and system for creating parameterized example instances ("p-instances") utilizing tooling instructions used to define the realization (or "instantiation") of data parameter values that result in customization of the "p-instances" into real instances reflecting the products generated by actual use of a software application.

The subject matter which is regarded as the invention is particularly pointed out and distinctly claimed in the concluding portion of the specification. The invention, however, together with further objects and advantages thereof, may best be understood by reference to the following description taken in conjunction with the accompanying drawings.

BRIEF DESCRIPTION OF THE DETAILED DRAWINGS

DETAILED DESCRIPTION OF THE PREFERRED EMBODIMENTS

Figure 3:
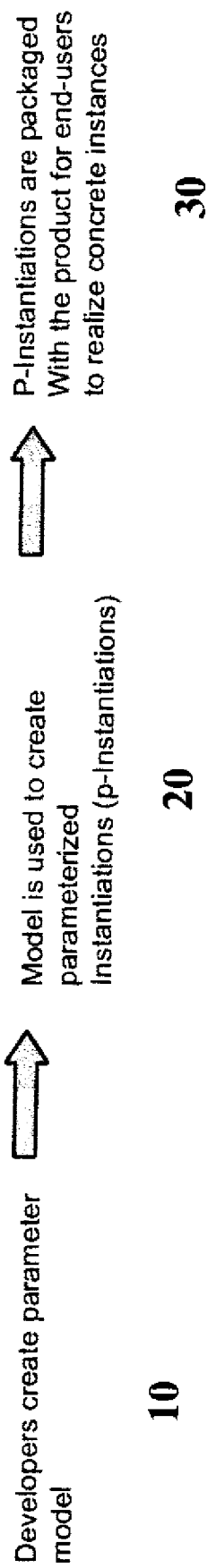
FIG. 3 illustrates the relationship between the "parameterization model" and the "parameterization framework" and the "instantiation framework" of the invention.

The invention provides a programming method and system for software application parameterization that consists of the following components: (i) a "parameter model" 10 reflecting development of the design of a software application in a way that can be used for its parameterization into data types and/or categories; (ii) a "parameterization framework" 20 used for creating parameterized example instances ("p-instances") 100 from the model; and (iii) an "instantiation framework" 30 used to set the parameter values for converting "p-instances" 100 into real instances 101 reflecting the data products generated by actual use of the software (e.g., a ".wsdl" file is an instance created with a WSDL editor). The relationship between the "parameterization model" and the "parameterization framework" and the "instantiation framework" is shown in FIG. 3.

Figure 4:
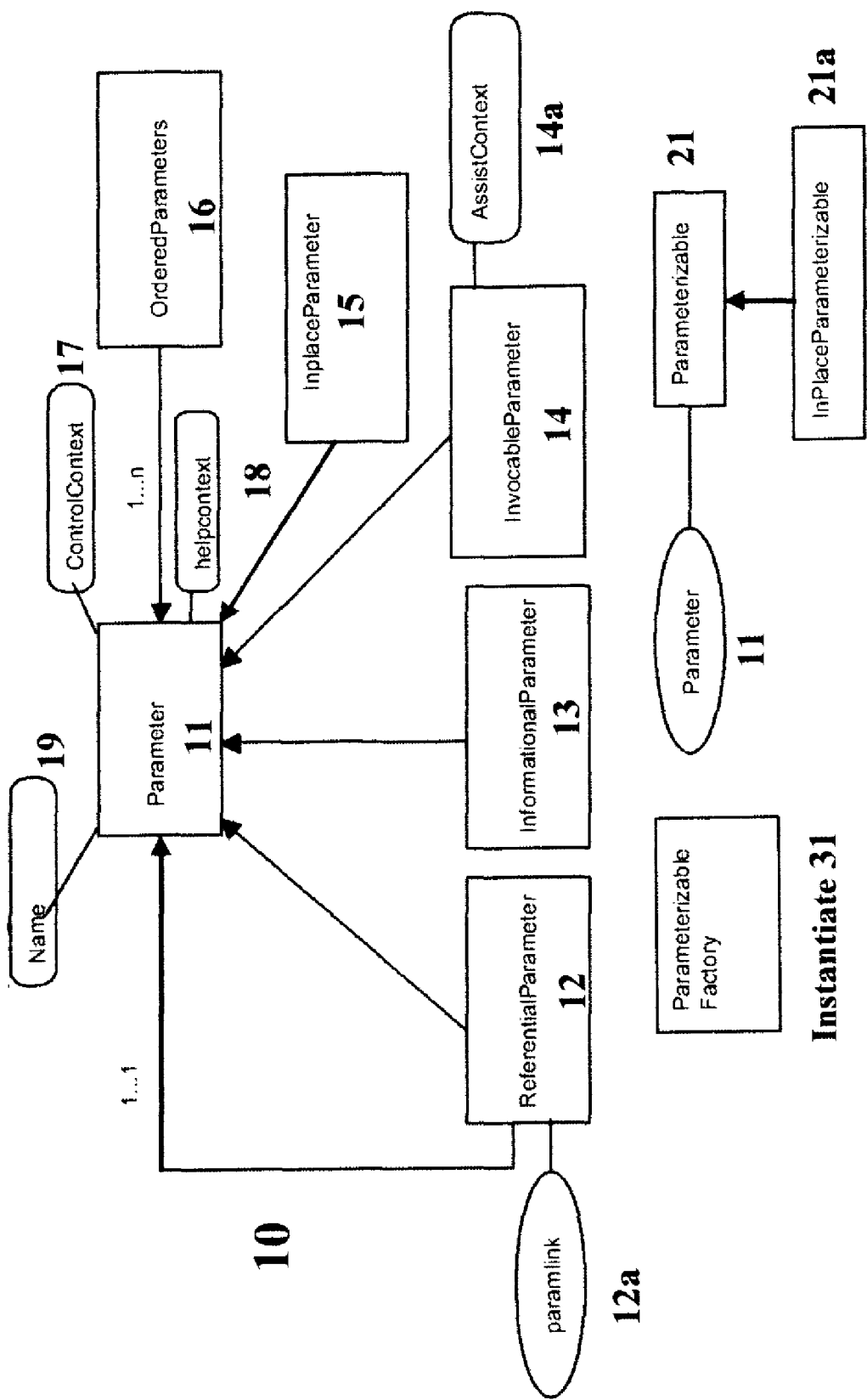
FIG. 4 illustrates the "parameterization model" of the invention.

The "parameter model" 10 can be represented by the diagram of FIG. 4. The core model element is "parameter" 11 which is a logical data entity that is not tied to any physical program element (such as a document or file or other artifact created by use of the application). The possible real (concrete) representations of a parameter 11 that can be used in a "p-instance" 100 are categorized as "referential parameter" 12 along with "informational parameter" 13 as well as "invocable parameter" 14 and "inplace parameter" 15 and "ordered parameter" 16 types. "Referential parameters" 12 can be used to represent parameter points that reference other parameters 11 located in another document or file or other program artifact, through use of the "paramlink" property 12*a* (such as an "xpath" expression) to identify (or "point to") the referenced parameter, which can in turn recursively refer to other "referential parameters" finally ending in an "informational parameter" or "inplace parameter" or an "invocable parameter". An "invocable parameter" 14 can have an "assist context" property 14*a* that can be instructional or textual help, but is preferably a GUI-based tool (such as a wizard, editor, etc.) that assists a user in converting (or "realizing") the parameterization into a real instance 101. The tooling 50 associated with an "invocable parameter" provides instructions (such as class name, input data, etc.) for use of its "assist context" to collect the data needed to realize the instantiation of a related document or file or other program artifact. An "informational parameter" 13 can be used to assist in realizing instantiation of a parameter (through use of instructions provided by the "help context" property or by the parameterization tooling) in cases where application legacy documents or files or other artifacts have contents that cannot be controlled by use of a GUI. For example, a Web Service Description Language (WSDL) legacy document has well-established data models that may not be possible to change, thus requiring the addition of Extensible Markup Language (XML) elements for inserting parameterization point(s) into the document without affecting the model. An "inplace parameter" 15 offers a mechanism to tie parameters to documents in this manner by placing parameterization information (e.g., a "parameter point" or "tag" defined in the model) in the correct physical location within the document being parameterized. An "ordered parameter" 16 is used to model an ordered collection of steps for parameter instantiation when there are dependencies between different parameters.

A "control context" property 17 may be defined for a parameter 11 to provide contextual information (such as identification of the physical program element(s) associated with that parameter). The "control context" 17 provides the needed information to instantiate a parameter 11 in conversion of a "p-instance" 100 into a real instance 101 of a document or file or other program artifact during actual use of the application. For example, a GUI element pointing to an "invocable parameter" 14 will contain the necessary information to launch its "assist context" 14*a* in order to instantiate that parameter (e.g., a WSDL Operation parameter could be represented as <OperationParameter filename="f.seqflow">). A "help context" property 18 can also be defined to represent a basic help facility for using a parameter (and can be contained in plain text file(s) if tooling instructions are not available for that parameter). The "name" property 19 (e.g., XML tag) can be used to identify the parameter as used in a "p-instance" 100.

Figure 2:
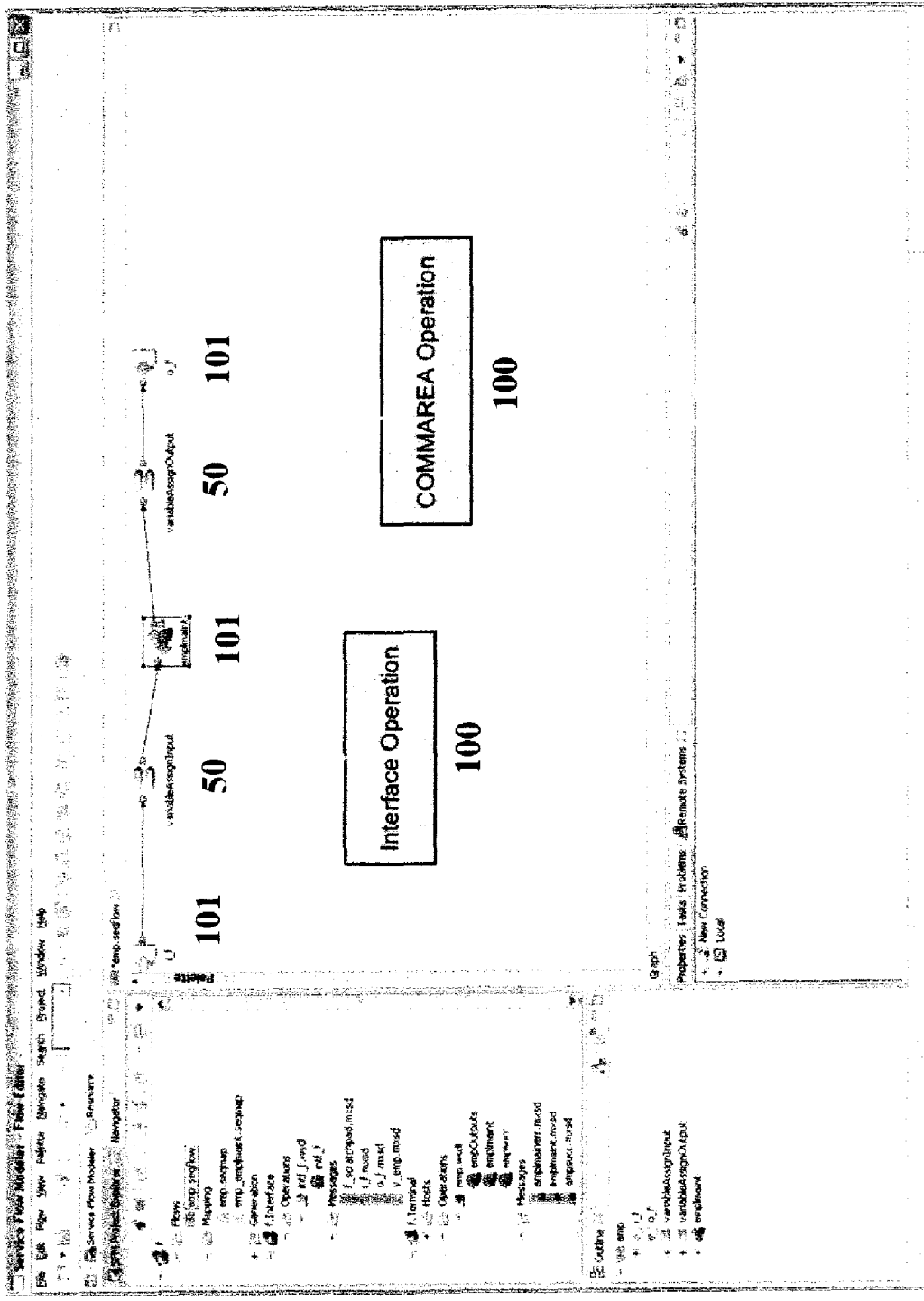

The "parameterization framework" 20 provides a programmatic means to create "p-instances" 100 utilizing the parameterization model 10 for a software application. Under this framework, parameterization is initiated using the "control context" 17 for the modeled parameter to invoke execution of a program method (named "parameterizable") 21 in order to implement the parameterization details using a predefined selected set of "invocable parameter" object classes 14 for realizing instantiation of the parameter as described above. An "invocable parameter" 14 or "informational parameter" 13 or "referential parameter" 12 type in an application can be modeled for use by the "parameterizable" program method, and the application can use the parameterization model framework to add "p-instance" parameterization points to the UI as shown in FIG. 2. Except for optional use of an "inplace parameter" 15, the model may not specify where parameterization information should be physically placed within a parameterized document or file or program artifact, in order to allow parameterization information to be stored in physical locations different from the document(s) or file(s) or artifact(s) comprising the "p-instance" 100. Implementation of the "instantiation framework" 30 to realize or convert a parameter 11 in this manner is accomplished by operation of the "instantiate" program method 31 upon the data contained in the "control context" 17 for that parameter (in a manner similar to operation of the "parameterizable" method described herein).

Parameterization of a complex software application must account for the following requirements: (a) parameters are generally not defined by simple data strings (for instance, a "WSDL message" parameter is a complex entity consisting of multiple data types that are specified using a GUI); (b) multiple related parameters are treated in a unified manner (i.e., an application interface operation is specified by defining the operation itself along with the reply and response messages used to execute it); (c) a change in a single parameter can affect multiple documents or files or other program artifacts using that parameter; and (d) there can be a range of increased complexity in parameter changes involving GUI interactions. As a result, one preferred approach for creating a "p-instance" 100 is to first create and parameterize a real instance 101 of use of the software, which is then utilized as a "template" for creating multiple additional "p-instances" that extend the possible uses of the application.

Figure 1:
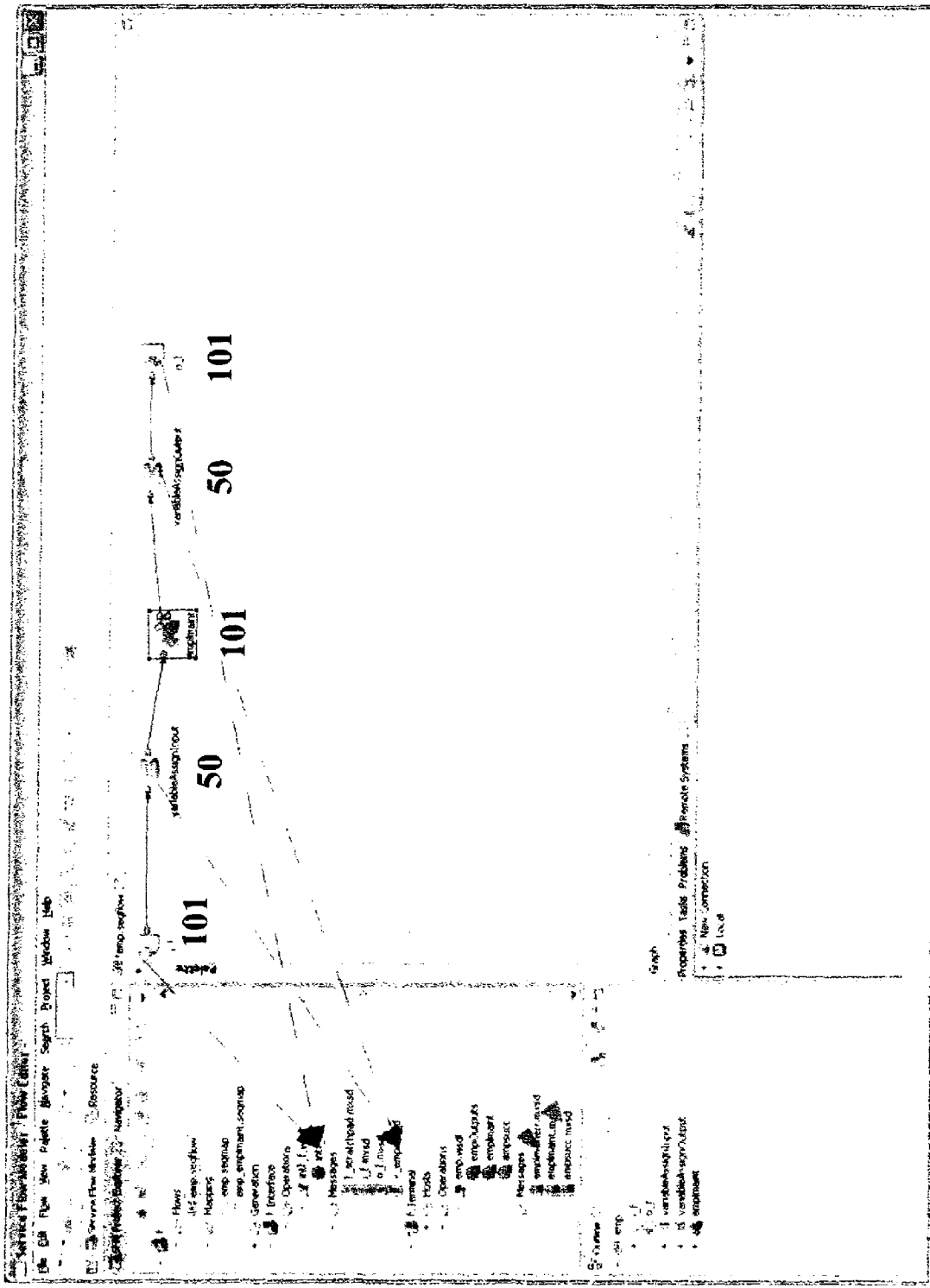
FIG. 1 and FIG. 2 illustrate a computer software application program product in which parameterization is implemented using a graphical user interface.

An example of a complex software application with which the invention can be used is Service Flow Modeler (SFM), which is an Eclipse-based tool used to model complex Customer Information Control System (CICS) applications in order to generate Common Business Oriented Language (COBOL) code from the models. FIG. 1 shows a document created by SFM in which a few GUI elements capture many parameter relationships that reference many other documents. FIG. 2 illustrates the development of a "parameterized template" of the example SFM application shown in FIG. 1 (utilizing the "parameter model" 10 along with the "parameterization framework" 20 and "instantiation framework" 30 described herein) to create two "p-instance parameterization points" 100 (shown in yellow) that utilize tooling instructions 50 invoked by a user to customize the parameters 11 with values that convert them into real instances 101 of the specified "Interface" and "COMMAREA" operations.

While certain preferred features of the invention have been shown by way of illustration, many modifications and changes can be made that fall within the true spirit of the invention as embodied in the following claims, which are to be interpreted as broadly as the law permits to cover the full scope of the invention, including all equivalents thereto.

What is claimed is:

1. A system, comprising:
a user interface; and
a computing device that generates output via the user interface by execution of:
- a parameter modeling component for designing an application by defining parameters for data types or categories of data products generated by use of the application and specifying instructions for the parameters;
- a parameterization component for creating an example instance of a data product generated by use of the application comprising one or more of the parameters; and
- an instantiation component for setting parameter data values using the instructions to convert the example instance of the data product generated by use of the application into at least one generated data product;
- wherein the example instance invokes the instructions to define data values for the parameters that customize the example instance into the at least one generated data product.

2. The system of claim 1, wherein the parameter modeling component comprises at least one logical data parameter component comprising at least one of the following components:
- a referential parameter component that references at least one other parameter located in another data product;
- an invocable parameter component invoking instructions used to convert the parameter for instantiation within the data product;
- an informational parameter component that realizes instantiation of a parameter having contents that are not controlled by a user interface;
- an inplace parameter component that places parameter data in a selected location within the data product; and
- an ordered parameter component providing steps for carrying out the parameter instantiation based upon dependencies between different parameters.

3. The system of claim 2, wherein parameterization is initiated by execution of at least one program method to implement a selected set of invocable parameters for realizing instantiation of the example instance into the at least one generated data product.

4. The system of claim 1, wherein an actual data product is parameterized for use as a template in creating the example instance.

5. A method, comprising:
- using a parameter modeling component for designing an application by defining parameters for data types or categories of data products generated by use of the application and specifying instructions for the parameters;
- using a parameterization component for creating an example instance of a data product generated by use of the application comprising one or more of the parameters; and
- using an instantiation component for setting parameter data values by use of the instructions to convert the example instance of the data product generated by use of the application into at least one generated data product;
- wherein the example instance invokes the instructions to define data values for the parameters that customize the example instance into the at least one generated data product.

6. The method of claim 5 wherein the parameter modeling component comprises at least one logical data parameter component comprising at least one of the following components:
- a referential parameter component that references at least one other parameter located in another data product;
- an invocable parameter component invoking instructions used to convert the parameter for instantiation within the data product;
- an informational parameter component that realizes instantiation of a parameter having contents that are not controlled by a user interface;
- an inplace parameter component that places parameter data in a selected location within the data product; and
- an ordered parameter component providing steps for carrying out the parameter instantiation based upon dependencies between different parameters.

7. The method of claim 6 further comprising initiating parameterization by execution of at least one program method to implement a selected set of invocable parameters for realizing instantiation of the example instance into the at least one generated data product.

8. The method of claim 5 further comprising parameterizing an actual data product for use as a template in creating the example instance.

* * * * *